United States Patent [19]

Keese

[11] 4,037,694
[45] July 26, 1977

[54] DRIVE AXLE OUTER END WITH BRAKE AND GEARING

[75] Inventor: Beverly W. Keese, Neenah, Wis.

[73] Assignee: Rockwell International Corporation, Pittsburgh, Pa.

[21] Appl. No.: 597,643

[22] Filed: July 21, 1975

[51] Int. Cl.² ............................................. B60K 29/02
[52] U.S. Cl. ..................................... 192/4 A; 74/391; 180/43 B; 188/71.5
[58] Field of Search .............. 192/4 A; 74/411.5, 391; 180/43 B, 65 F; 188/71.5, 366

[56] References Cited

U.S. PATENT DOCUMENTS

| | | |
|---|---|---|
| 2,417,856 | 3/1947 | Barish ............................... 188/366 X |
| 2,832,428 | 4/1958 | Kelley et al. ..................... 192/4 A X |
| 3,150,532 | 9/1964 | Bixby ........................................ 74/391 |
| 3,301,359 | 1/1967 | Cole et al. ............................. 192/4 A |
| 3,439,766 | 4/1969 | Dence et al. ........................ 180/43 B |
| 3,754,625 | 8/1973 | Voth et al. ............................ 192/4 A |

*Primary Examiner*—Benjamin W. Wyche

[57] ABSTRACT

A multiple disc friction brake assembly for a drive axle outer end of the planetary reduction type. A plurality of axially movable brake discs are provided internally of a wheel hub with alternate discs being fixed against rotation relative to the axle housing and intermediate discs being non-rotatably secured to one of the rotary elements in the final drive downstream of the axle shaft input.

4 Claims, 4 Drawing Figures

4,037,694

DRIVE AXLE OUTER END WITH BRAKE AND GEARING

BACKGROUND OF THE INVENTION

This invention is directed to a drive axle outer end and, more specifically to a multiple disc friction brake assembly for a drive axle outer end of the planetary reduction type.

Planetary reduction outer ends are used as the final drive in axles for many heavy duty, off-highway type vehicles which are employed in the construction, logging and mining industries, as well as in farming and for mobile materials handling equipment and heavy industrial machinery. As in conventional vehicles, brake mechanisms are associated with the drive axle outer end to restrain rotation of the final drive mechanism and the wheel or sprocket driven thereby. One such planetary outer end employing a drum type friction brake is disclosed in U.S. Pat. No. 3,042,145 and 3,150,532 which issued to L. A. Bixby on July 3, 1962 and Sept. 29, 1964, respectively.

A multiple disc friction brake arranged to restrain rotation of a differential shaft input to a planetary gear reduction provided in the differential housing of a drive axle is disclosed in U.S. Pat. No. 3,382,952 issued to G. Grattapaglia on May 14, 1968. Another multiple disc brake assembly arranged to restrain rotation of an input shaft to a planetary gear reduction drive train is disclosed in U.S. Pat. No. 2,953,040 which issued to H. W. Christenson et al on Sept. 20, 1960. In the foregoing disclosures the multiple disc friction brakes engage the input shaft to the planetary reduction upstream of the shaft input to the reduction gearing. Those brakes will therefore not restrain rotation of the reduction gearing for the output member driven by that gearing if the axle or input shaft breaks between the rotor friction discs and the input to the planetary reduction gearing. The multiple disc friction brakes disclosed in the foregoing patents are also remote from the final drive output member and restrain rotation of that member only through the gear reduction and shafts drive connecting the planetary gear reduction and the output member. Thus, those brake mechanisms would also be ineffective in the event of failure of the shaft drive connecting the planetary gear reduction and the output member.

The failure of a drive shaft, whether it be an axle shaft serving as an input to the final drive or a stub shaft directly driving an output member, is not an uncommon occurrence in drive axles for heavy duty equipment. It is therefore advantageous to have the brake mechanisms provided to such drive axles operative on the final reduction gearing and the output member independently of the input shaft and any shaft drive connecting the reduction gearing to the output member.

SUMMARY OF THE INVENTION

The present invention provides a final drive and brake assembly for an axle outer end comprised of an axle shaft, an axle housing, an output member rotatably mounted on the housing, and a plurality of rotary elements comprising a power train drive connecting the axle shaft to the output member internally of the output member. The brake mechanism is a multiple disc friction brake comprised of a plurality of axially movable brake discs carried internally of the output member. Alternate discs are fixed against rotation relative to the axle housing. Intermediate discs are non-rotatably secured to one of the rotary elements downstream of the axle shaft in the power train drive connecting the axle shaft to the output member. An abutment is provided to prevent axial movement of the brake discs beyond a predetermined point and actuating means are provided to move the brake discs axially toward the abutment and into frictional contact with one another thereby restraining rotation of the one rotary element and the output member.

The present invention thus provides a multiple disc friction brake mechanism which is operative on the power train connecting the axle shaft and the output member downstream of the axle shaft input to the power train and operates independently of the axle shaft per se.

In a preferred form the present invention also provides a self-contained final drive and brake assembly for an axle outer end in which a wheel hub is driven by a planetary gear carrier and the multiple disc friction brake is directly operative on the pinion driving the planetary pinions. In that embodiment the multiple disc friction brake is operative to restrain rotation of the planetary reduction drive and the output member independently of any torque transmitting drive shafts.

In the preferred form of the invention to be described more fully herebelow the final drive and brake assembly are compactly provided internally of a wheel hub in a chmaber in which the elements drive connecting the axle shaft and the wheel hub, the wheel hub bearings and the multiple disc friction brake assembly are subject to the cooling and lubricating action of a common pool of lubricant. The foregoing and other advantages offered by the final drive and brake assembly of the present invention will become more evident from the following description of the accompanying drawings.

BRIEF DESCRIPTION OF THE DRAWINGS

In the drawings wherein like reference numerals refer to like parts throughout.

DESCRIPTION OF AN EMBODIMENT

Figure 1:
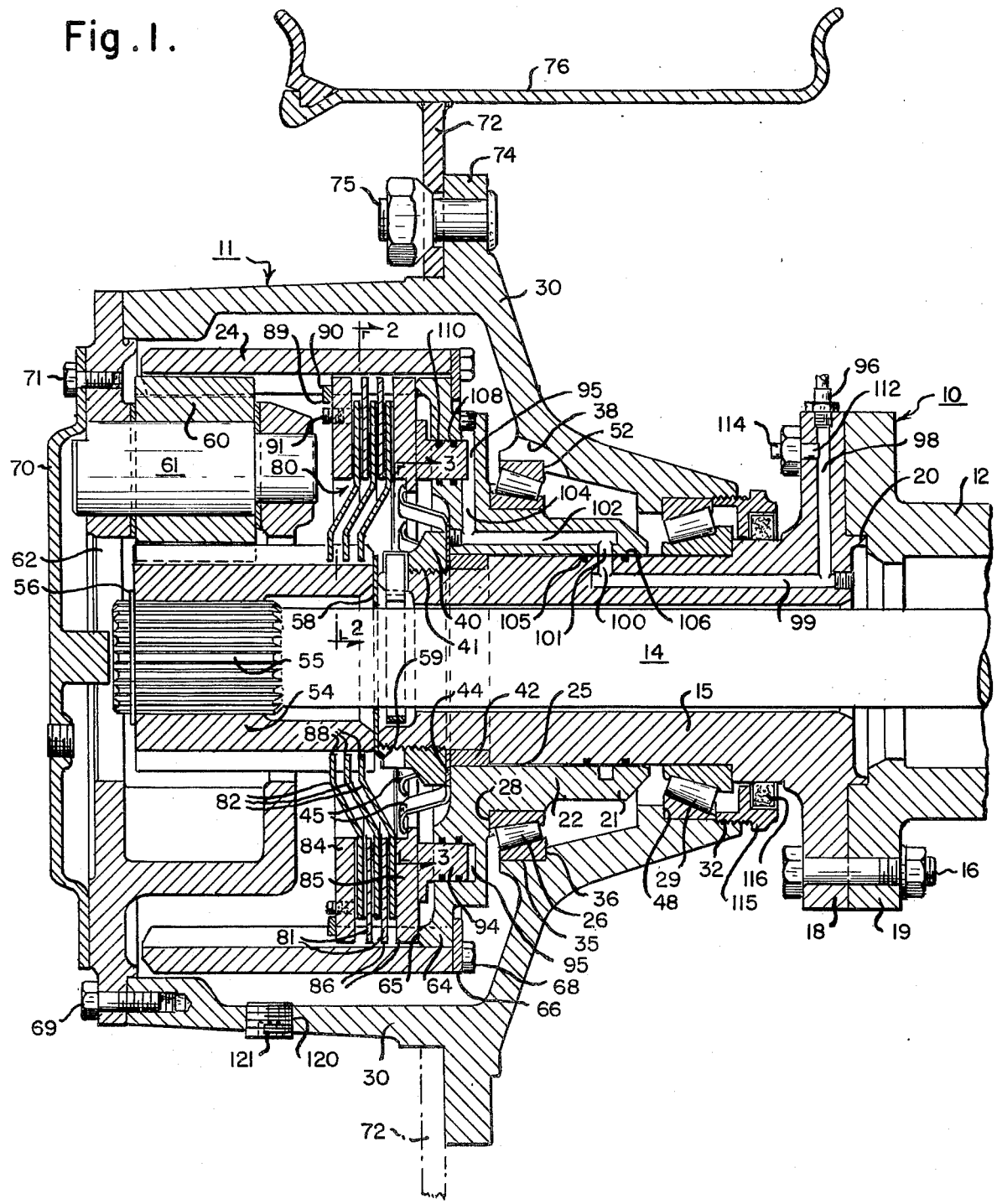
FIG. 1 is a fragmentary, partially sectioned view of a drive axle outer end embodying the final drive and brake assembly of the present invention.

With reference to the drawings and particularly to FIG. 1 the drive axle 10 is equipped at each end with a planetary gear outer end assembly 11 and has an axle housing 12 containing a differential connected rotatable axle shaft 14. An axially outwardly extending hollow spindle 15 is fixed to the end of axle housing 12 in surrounding relation to shaft 14 by suitably circumferentially spaced bolt assemblies 16 rigidly connecting mating flanges 18 and 19 on spindle 15 and axle housing 12 and which are piloted in concentric alignment at 20.

The hub 21 of a mounting member 22 which supports a planetary ring gear 24 is internally splined at 25 to spindle 15 and supports the outboard wheel bearing 26 with its inner race in abutment with shoulder 28 thereof. Opposed tapered roller-type anti-friction bearings 26 and 29 journal the wheel hub 20, bearing 29 being received in the end bore 32 of wheel hub 30 with its outer race in abutment with shoulder 34 and bearing 26 being received in the opposite end bore 35 of hub 30 with its outer race in abutment with shoulder 36. A groove 38 is provided to the end bore 35 and shoulder 36. The groove 38 traverses the outer race of the wheel bearing 26 to enhance the flow of lubricnt past the bearing 26 to the inner bearing 29.

A nut 40, which is threaded at 41 on the outer end of spindle 15 may be manipulated to adjust the preloading of wheel bearings 26 and 29. The nut 40 also holds a brake return spring 44 having radially extending elements 45 and the ring gear support member 22 in axially fixed relation on the spindle 15. An annular bushing spacer 42 is received within the end of the bore of the hub 21 of mounting member 22 between the end of its internal splines 25 and the adjacent face of nut 40 in surrounding realtion to spindle 15 to maintain a fixed concentricity between mounting member 22 and spindle 15.

Figure 3:
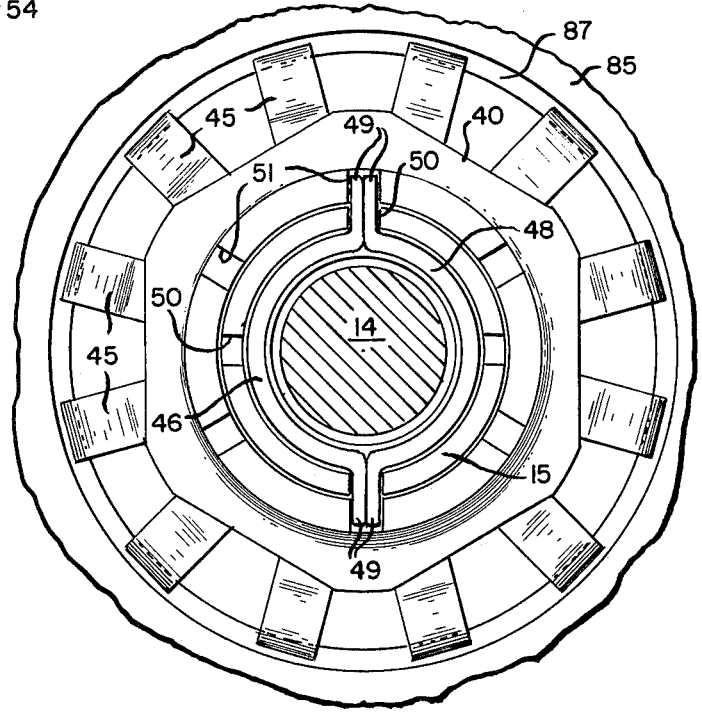
FIG. 3 is a sectional view taken along the line 3—3 of FIG. 1.
Figure 4:
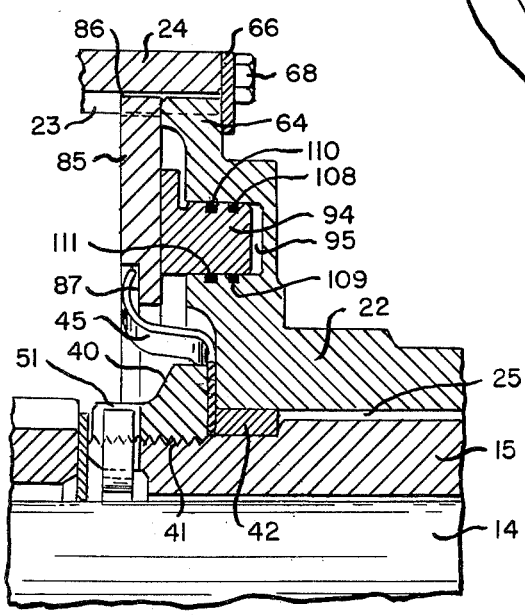
FIG. 4 is a fragmentary sectional view taken along the line 4—4 of FIG. 3.

Referring also to FIGS. 3 and 4 nut 40 is locked against rotation in its adjusted position on threads 56 of spindle 15 by two semi-circular stampings 46 and 48 each of which is formed with an arcuate portion terminating in radially extending flange ends 49 which project radially through diametrically opposed radial slots 50 in the end face of spindle 15 and through aligned radially extending slots 51 in the end face of the integral hub of nut 40. The end face of nut 40 has three diametrically opposed equiangulaly spaced pairs of slots 51 and the end face of spindle 15 has two equiangularly spaced pairs of diametrically opposed slots 50. This combination of slots 50 and 51 give twelve possible locked settings for each 360 degrees of rotation of nut 40 which is satisfactory for bearing adjustment.

Referring again to FIG. 1 a planetary pinion or sun gear 54 is splined at 55 to the outer end of axle shaft 14 and is axially restrained in position thereon by snap ring 56 and a washer 58. Rotation of washer 58 is prevented by a tab 59 which projects into one of the slots 50 in the end of spindle 15. Sun gear 54 meshes with three equiangularly disposed planetary pinions 60 which are journalled on pins 61 extending between and fixed to the opposed walls of planetary pinion carrier 62. Planetary pinions 60 mesh with internal ring gear 24 which is splined at 64 to ring gear mounting member 22. Ring gear 24 is held axially in place on mounting member 22 between the radial shoulder defined by the end face 65 of the ring gear teeth and a washer 66 held in place on the end of the ring gear 24 by a plurality of bolts 68.

In operation, when planetary pinions 66 load ring gear 24 the splines 64 permit slight resilient deformation of gear 24 from its normal circular shape toward an arcuate triangulated shape. If the gear 24 were formed integral with mounting member 22 the gear 24 would distort in the form of a bell mouth when the load is applied by the planetary pinions 60.

The planetary pinion carrier 62 is fastened to wheel hub 30 by stud and nut assemblies 69 and forms an apertured end plate which is closed by a housing end plate 70 secured by bolts 71 to the carrier 62. A wheel disc 72 carrying a wheel rim 76 is secured to the flange 74 of wheel hub 30 in conventional manner by stud and nut assemblies 75.

Figure 2:
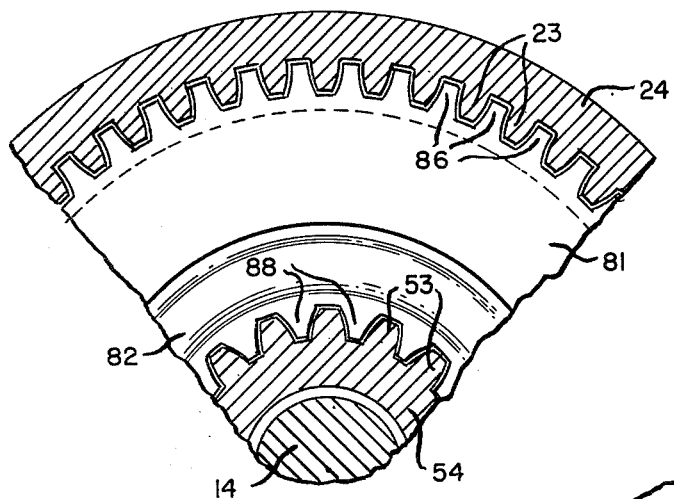
FIG. 2 is a fragmentary view taken along line 2—2 of FIG. 1.

A multiple disc friction brake generally designated by the numeral 80 is provided internally of the wheel hub 30. The brake, as best shown in FIGS. 1 and 2, comprises a stack of axially movable annular brake discs 81, 82 disposed between a pair of axially movable annular pressure plates 84, 85. The pressure plates 84, 85 and alternate brake discs 81 are provided with tabs 86 around their respective outer peripheries. The tabs 86 are received in the spaces between the teeth 23 provided to ring gear 24. The tabs 86 are slightly smaller than the spaces between the teeth 23 thereby permitting the pressure plates 84, 85 and brake discs 81 to move relative to the axis of the ring gear 24 while securing the pressure plates and discs against rotation relative to the ring gear.

The brake discs 82 intermediate the pressure plate 84, 85 and brake discs 81 are provided with tabs 88 integrally formed around their inner peripheries. The tabs 88 are received in the spaces between the teeth 53 provides to the pinion or sun gear 54. The tabs 88 are slightly smaller than the spaces between the teeth 53 thereby permitting brake discs 82 to move relative to the axis of the pinion gear 54 while restraining the same against rotation relative to that gear.

The surfaces of the brake discs 82 which are disposed opposite the surfaces of the pressure plates 84, 85 and brake discs 81 are preferably provided with a friction lining material. A sintered bronze friction material may be bonded to the oppositely disposed braking surfaces of discs 82 or any of a number of other friction materials may be employed. The friction brake 80 thus provides a plurality of axially movable brake discs with pressure plates 84, 85 and alternate discs 81 serving as stator members fixed against rotation to the ring gear 24 and axle housing 12 and the intermediate brake discs 82 serving as rotors fixed for rotation with the pinion or sun gear 54.

The intermediate brake discs 82 are freely axially movable relative to the sun gear 54, axial movement of the brake discs or rotor members 82 being limited only by the presence of the stator members, i.e., pressure plates 84, 85 and intermediate brake discs 81. Axial movement of the stator members is limited by a snap ring 89 seated in a groove 90 cut through the teeth 23 provided around the internal periphery of ring gear 24. After the ring 89 is seated in the groove 90 a plurality of set screws 91 are backed out of threaded openings provided to the pressure plate 84 to prevent the ring 89 from being dislodged from groove 90. The ring 89 serves as an abutment limiting the extent of axially outward movement of the pressure plate 84, brake discs 81, 82 and pressure plate 85.

The friction brake 80 is hydraulically actuated by an annular piston 94 disposed within recess 95 provided to ring gear mounting member 22. Hydraulic fluid under pressure is supplied to recess 95 by means of a connection from a suitable source to fitting 96 through fluid passages 98, 99 and 100. Fluid passage 100 extends radially outwardly of the spindle 15 and communicates with an inwardly open fluid passage 101 provided in the form of a circumferential groove extending around the internal surface of ring gear mounting member 22. The annular groove 101 is in fluid communication with the recess 95 by means of fluid passageways 102 and 104. A pair of annular seals 105 and 106 are disposed on axially opposite sides of the annular groove 101 between the ring gear carrier 22 and spindle 15 to prevent hydraulic fluid leakage along that inner face. A pair of annular seals 108 and 109 are disposed in circumferentially extending grooves provided in the piston 94 between the piston 94 and the sidewalls of recess 95 to prevent hydraulic fluid leakage outwardly along the sidewalls of the piston. An additional pair of annular seals 110 and 111 are provided in circumferentially extending grooves in the piston 94 to prevent lubricant from the sealed outer end from entering the hydraulic fluid system. A bleeder fitting 114 is provided to the hydraulic fluid system by means of a threaded port 112 which intersects hydraulic fluid passage 98.

The friction brake 80 is actuated by increasing the hydraulic fluid pressure in recess 95 by conventional means to move the piston 94 to the left as shown in FIG. 1. The piston 94 in turn moves the pressure plate 85, brake discs 81 and 82 and pressure plate 84 to the left until pressure plate 84 abuts the snap ring 89. The friction lined outer surfaces of the intermediate brake discs 82 which are rotating with the pinion or sun gear 54 are then compressed between the pressure plates 84, 85 and alternate brake discs 81 which are secured against rotation to the ring gear 24 and axle housing 12. The friction developed between the interfacing surfaces of intermediate brake discs 82 and pressure plates 84, 85 and brake discs 81 restrains rotation of the intermediate brake discs 82 and the pinion or sun gear 54. This restrains rotation of the axle shaft splined interiorly of the pinion gear 54 as well as the planetary reduction gearing and the wheel hub 30. The braking action is applied to the planetary reduction gearing and the wheel hub 30 independently of the axle shaft 14. When the hydraulic pressure is released in recess 95, the radially extending elements 45 of return spring 44 which engage in annular shoulder 87 provided to pressure plate 85 disengages the brake discs and moves the pressure plate 85 and piston 94 to the right relative to ring gear carrier 22 as shown in FIG. 1.

The hub end plate 70 and planetary gear carrier 62 cooperate with wheel hub 30 to provide an enclosed housing for the final drive planetary gearing, the multiple disc friction brake 80, and the inner and outer wheel bearings 26 and 29 to enable those components as well as the outer end of the axle shaft 14 to be subject to the action of a common pool of lubricant. A die cast oil seal retainer 115 is press fitted into the end bore 32 of wheel hub 30 and an oil seal 116 which is retained thereby and which is in annular contact with the exterior surface of spindle 15, effectively precludes loss of oil between the wheel hub 30 and the exterior of spindle 15. Experience has shown that there is no significant flow of lubricant to the hollow axle housing 12. Thus, when the brake and final drive assembly of the present invention is complted a suitable quantity of the recommended lubricant may be introduced through the threaded drain and fill port 120 in wheel hub 30. The port 120 is then closed with a hex head plug 121. An oil level port 118 closed by a plug 119 is provided in hub end plate 70.

Although the foregoing description has been generally directed to providing a final drive axle outer end for a wheeled vehicle the output member could provide a sprocket drive for a track vehicle as well as a wheel hub.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An axle outer end assembly comprising:
   a hollow spindle,
   an axle shaft projecting from said spindle,
   an output member rotatably mounted on said spindle,
   a planetary drive operably connecting said axle shaft and said output member, said planetary drive including a ring gear having a set of teeth, said gear being fixed to said spindle and a plurality of pinion gears engaging the teeth at one end of said ring gear,
   a disc brake comprising a plurality of axially movable discs having projections extending radially outward into engagement with the teeth at the other end of said ring gear and second axially movable disc means comprising at least one disc intermediate adjacent ones of said first plurality of discs, said second disc means being non-rotatably secured to an element of said planetary drive,
   abutment means preventing axial movement of said discs and disc means beyond a predetermined point, and
   brake actuating means operative to move said discs and disc means axially toward said abutment means and into frictional contact with one another whereby said element and said output member are restrained against rotation.

2. The axle outer end assembly defined by claim 1 wherein said planetary drive includes a sun gear non-rotatably mounted to said axle shaft and said second disc means includes projections extending radially inward into engagement with teeth provided to said sun gear whereby said second disc means are engaged for rotation with said sun gear and free to move axially relative to said sun gear.

3. The axle outer end assembly defined by claim 1 wherein said abutment means is a ring seated in a groove provided to said ring gear intermediate said pinion gears and said disc brake.

4. The axle outer end assembly defined by claim 3 including a plurality of abutments carried by said disc brake and preventing said ring from being dislodged from said groove.

* * * * *